Patented Aug. 13, 1940

2,211,139

UNITED STATES PATENT OFFICE 2,211,139

FATTY ACID SOAP AND PROCESS OF PRODUCING SAME

Francis J. Licata, New York, N. Y., assignor to National Oil Products Company, Harrison, N. J., a corporation of New Jersey No Drawing. Application February 10, 1938, Serial No. 189,899

13 Claims. (Cl. 260—414)

The invention relates, in general, to new compounds and, more particularly, to new soaps of hydroxylated fish oils and to correlated improvements in the production of such soaps.

The general object of the invention is to provide novel products from fish oils.

A specific object of the invention is to provide a nonfusible soap of fish oils in powdered form.

Another object of the invention is to provide a powdered soap fish oil which is substantially resistant to spontaneous combustion.

A further object of the invention is to provide a water-insoluble, powdered soap of fish oil, which is substantially infusible under normal working conditions.

An additional object of the invention is to provide a metallic soap of fish oil in powder form which may be stored in warm places without suffering any deleterious effects.

An additional object is to provide a water-soluble soap which remains highly soluble in water irrespective of its high metallic content.

Other objects will in part be obvious and will in part appear hereinafter.

The value of metallic soaps of stearic and like fatty acids has long been recognized in the art of waterproofing various products and structures. Aluminum, calcium and like soaps of stearic acid are characterized by being substantially nonfusible under ordinary operating conditions and they may be produced in powdered form without any fear of spontaneous combustion occurring during storage, even in warm places.

Nothwithstanding the great value of soaps of the aforementioned type, their use in industry has been restricted in many cases due to the high cost of fatty acids such as stearic, oleic and like acids. It has now been discovered that soaps having equal industrial value and application, possessing substantially the same or improved properties as calcium and aluminum stearates and similar soaps, may be produced from the relatively inexpensive fish or like oils.

According to the invention, the novel infusible soaps of fish oil in powdered form may be produced by the process of the invention which comprises treating a hydroxylated fish oil with a saponifying agent in an amount of at least 15%, based on the weight of the oil, in excess of that stoichiometrically required to completely saponify the saponifiable constituents of the oil. The saponifying agent employed is preferably a water-soluble alkaline substance, such as, sodium, potassium, ammonium, etc., hydroxides, carbonates, etc., sodium hydroxide being highly preferred. The water-soluble soap thus obtained may be precipitated with any water-soluble salt of calcium, aluminum, etc. to form the corresponding water-insoluble soap.

The invention accordingly comprises the several steps and relation of one or more of such steps with respect to each of the others, and the product possessing the features, properties and the relation of elements, which are exemplified in the following detailed disclosure, and the scope of the invention will be indicated in the claims.

The products of the invention may be prepared from any suitable hydroxylated fish oil fatty acid or fatty glyceride or fish oils normally rich in these substances. While fish oils of any type may be employed, it is preferable to use cod, halibut, sardine and like oils which are by-products from vitamin extraction processes. Such oils are plentiful and obtainable at relatively low cost. The fatty glycerides and fatty acids which constitute the major part of these fish oils may be hydroxylated according to any known process, the following procedure being given merely to illustrate a suitable method. The fish oil is treated with 50% of 66° Baumé sulfuric acid at 10° C. to 20° C. for about two hours. The product (sulfated fatty esters) is poured into an equal volume of water and live steam passed through the solution until the acid esters are completely hydrolized. The acid water is then drawn off and the oil layer is washed with hot water.

In effectuating the purposes of the invention any suitable hydroxylated fish oil prepared by the foregoing or any other process is reacted under appropriate conditions with a water-soluble alkaline substance, the quantity of which is used in excess of that which is stoichiometrically required to completely saponify the oil. The excess saponifying agent used may range from 15% to 200% (based on the weight of the fish oil) the preferred range, however, being 30% to 100% excess. The water-soluble soaps thus obtained display a novel property in that the increasing metallic content does not substantially affect the consistency or viscosity of an aqueous solution thereof. For example a soap containing a 70% excess metal content displays substantially the same solubility in water as does a normal soap formed with the stoichiometrical quantity of alkali. Moreover, these water-soluble soaps are difficult to salt out and apparently form a true solution other than the usual colloidal solution.

The water-soluble soap prepared in the foregoing manner may be precipitated with calcium chloride, aluminum sulfate or any other similar water-soluble polyvalent metallic salt to form the corresponding metallic soap. The temperature under which precipitation is carried out depends upon various factors such as the concentration of the soap solution, the metallic content of the soap, etc.

While it has been conclusively proven that the soaps of the present invention have a metallic content in excess of that normally or stoichiometrically obtained, no particular theory can be advanced to explain this phenomena. The excess metal may or may not be organically combined with the fatty portion of the soap molecule. In any event, the excess metal is chemically combined in some manner, as the products are highly stable and possess properties which are distinctly different from the properties of soaps of the same fatty acids combined with the stoichiometrical quantity of alkali. For example, a calcium soap of hydroxylated fish oil containing the stoichiometrical quantity of calcium has an ash of about 9.9% and is fused at room temperature; whereas a calcium soap of the same acids produced by employing 75% excess alkali (based on the weight of the oil) is a powdered material which is not affected at 100° C. and which has an ash of 37%. As the metallic content of the water-insoluble soaps is increased, the fusion temperature is increased.

The following table summarizes certain physical properties of a calcium soap of hydroxylated fish oils when the indicated excess of sodium hydroxide is used in the saponification step.

| Sample | Excess NaOH above stoichiometrical ratio | Ash | Characteristics |
| --- | --- | --- | --- |
| | | Percent | |
| A | None | 9.9 | Fused at room temperature. |
| B | 15% (based on weight of oil). | 16.0 | Slight fusion at room temperature. |
| C | 30% (based on weight of oil). | 20.0 | Very slight fusion at room temperature. |
| D | 75% (based on weight of oil). | 37.0 | No fusion at 100° C. |

Further evidence of the peculiar stability of the high metallic content soap is shown below by its behavior in a Mackey oxidation tester (test used to determine fire hazard of oils). Samples C and D of above table are compared:

| Sample | Time in minutes | | | | | | | | | | |
| --- | --- | --- | --- | --- | --- | --- | --- | --- | --- | --- | --- |
| | 15 | 30 | 60 | 90 | 120 | 150 | 180 | 210 | 240 | 270 | 300 |
| | °C. | | | | | | | | | | |
| C | 70 | 83 | 93 | 101 | 102.5 | 103 | 109 | 105 | 104 | | |
| D | 60 | 76 | 90 | 96 | 97 | 97.5 | 97.5 | 97.5 | 98 | 98 | 98 |

Sample C fused solid during the test, whereas sample D did not fuse.

For a fuller understanding of the nature and objects of the invention, reference should be had to the following examples which are given merely to further illustrate the invention and they should not be construed in a limiting sense.

Example I 1,000 lbs. of fish oil, hydroxylated according to the aforementioned process, are mixed with 835 lbs. of dry caustic soda (an excess over stoichiometrical ratio of 750 lbs. based on weight of oil). Aqueous $CaCl_2$ is then added in a quantity stoichiometrically sufficient to react with all the soda. The precipitated calcium soap is washed and dried. The ash of the dry product is 37.0%.

Example II 500 lbs. of hydroxylated fish oil are saponified with 74.8 lbs. NaOH and diluted to a 5% soap solution. 200 lbs. of excess NaOH are then added. A solution of aluminum sulfate containing 472 lbs. of the salt is used to precipitate the aluminum soap which is then washed, filtered and dried.

Example III 500 lbs. of hydroxylated fish oil are saponified with 445 lbs. of caustic soda (dry). The soda soap thus formed is precipitated with 850 lbs. of $CaCl_2$ (dry). A yield of 837 lbs. of soap was obtained which had an ash of 34.4%.

In a similar or other known manner, the metallic soaps of other metals may be prepared, as of lead, magnesium, copper, mercury, iron, zinc, etc. The soaps may also be produced by the fusion process. It is to be understood that cheap unsaturated oils obtained from sources other than fish may also be used in producing the products of this invention.

Since certain changes in carying out the above process and certain modifications in the composition which embody the invention may be made without departing from its scope, it is intended that all matter contained in the above description shall be interpreted as illustrative and not in a limiting sense.

It is also to be understood that the following claims are intended to cover all the generic and specific features of the invention herein described, and all statements of the scope of the invention, which as a matter of language, might be said to fall therebetween.

Having described my invention, what I claim as new and desire to secure by Letters Patent is:

1. A process of producing a new metallic soap which comprises saponifying a hydroxylated fish oil with an alkaline agent in an amount of at least 30%, based on the weight of the oil, in excess of that required for stoichiometrical combination, and precipitating the soap thus formed with a salt of a polyvalent metal to form the corresponding metallic soap.

2. A process of producing a new metallic soap which comprises saponifying a hydroxylated fish oil with sodium hydroxide in an amount of at least 30%, based on the weight of the oil, in excess of that required for stoichiometrical combination, and precipitating the soap thus formed with a salt of a polyvalent metal to form the corresponding metallic soap.

3. A process of producing a new metallic soap which comprises saponifying a hydroxylated cod oil with sodium hydroxide in an amount of at least 30%, based on the weight of the oil, in excess of that required for stoichiometrical combination, and precipitating the sodium soap with a calcium salt to form the corresponding calcium soap.

4. As a new composition of matter, a water-insoluble soap of a hydroxylated fish oil having an ash value of at least 30%.

5. As a new composition of matter, a water-insoluble soap of a hydroxylated fish oil having an ash value of about 32–39%.

6. As a new composition of matter, a calcium soap of a hydroxylated fish oil having an ash value of at least 30%.

7. As a new composition of matter, a metallic soap of a hydroxylated fatty acid having a metallic content in excess of stoichiometrical proportions and an ash value of at least 30%.

8. A process of producing a new metallic soap which comprises hydroxylating an unsaturated oil, saponifying the hydroxylated oil with an alkali in an amount of at least 15%, based on the weight of the oil, in excess of that required for stoichiometrical combination and precipitating the soap thus formed with a salt of a polyvalent metal to form the corresponding metallic soap.

9. A process of producing a new metallic soap which comprises hydroxylating a fish oil, saponifying the hydroxylated oil with sodium hydroxide in an amount of at least 15%, based on the weight of the oil, in excess of that required for stoichiometrical combination and precipitating the soap thus formed with a salt of a polyvalent metal to form the corresponding metallic soap.

10. As a new composition of matter, a metallic soap of a hydroxylated fish oil having an ash value of at least 16%.

11. As a new composition of matter, a metallic soap of a hydroxylated cod oil having an ash value of at least 16%.

12. As a new composition of matter, an aluminum soap of a hydroxylated fish oil having an ash value of at least 16%.

13. As a new composition of matter, a calcium soap of a hydroxylated fish oil having an ash value of at least 16%.

FRANCIS J. LICATA.